US007298364B2

(12) United States Patent
Matsuda

(10) Patent No.: US 7,298,364 B2
(45) Date of Patent: Nov. 20, 2007

(54) DISPLAY DEVICE

(75) Inventor: Kouichi Matsuda, Tokyo (JP)

(73) Assignee: Sony Corporation, Tokyo (JP)

( * ) Notice: Subject to any disclaimer, the term of this patent is extended or adjusted under 35 U.S.C. 154(b) by 704 days.

(21) Appl. No.: 10/785,323

(22) Filed: Feb. 24, 2004

(65) Prior Publication Data

US 2004/0164969 A1 Aug. 26, 2004

(30) Foreign Application Priority Data

Feb. 26, 2003 (JP) ............................ P2003-049955

(51) Int. Cl.
*G06F 3/041* (2006.01)
(52) U.S. Cl. .................. 345/173; 345/174; 178/18.01; 178/18.03
(58) Field of Classification Search ................ 345/156, 345/162, 173–178; 178/18.01–18.07
See application file for complete search history.

(56) References Cited

U.S. PATENT DOCUMENTS

2004/0090470 A1* 5/2004 Kim et al. .................. 345/846

2006/0139320 A1* 6/2006 Lang .......................... 345/156

FOREIGN PATENT DOCUMENTS

JP 07-222027 8/1995

* cited by examiner

*Primary Examiner*—Vijay Shankar
(74) *Attorney, Agent, or Firm*—Finnegan, Henderson, Farabow, Garrett & Dunner, L.L.P.

(57) ABSTRACT

When the user pushes an input button 5, upper, lower, left and right input buttons 2, 4, 6 and 8 adjacent to the pushed button 5 are animated convergently toward the pushed button 5. Also, the input buttons adjacent to the pushed input button look as if a first side of each adjacent input button adjacent to the pushed input button rotated downward while the second side moved toward the pushed input button. Concerning the movement of one of the adjacent input buttons to be animated, the adjacent input button will look as if one side thereof adjacent to th pushed input button rotated downward about a second side thereof opposite to the first side while the second side moved toward the pushed input button. Thus, the present invention provides a highly user-friendly electronic appliance using a touch panel capable of displaying button images easily discernible by the user even if its display screen is limited in area and each on-screen button occupies the limited display area.

7 Claims, 14 Drawing Sheets

901

| BUTTON TO BE PUSHED | BUTTON TO BE ANIMATED |
|---|---|
| 1 | 2, 4 |
| 2 | 1, 3, 5 |
| 3 | 2, 6 |
| 4 | 1, 5, 7 |
| 5 | 2, 4, 6, 8 |
| 6 | 3, 5, 9 |
| 7 | 4, 8 |
| 8 | 5, 7, 9 |
| 9 | 6, 8 |

FIG. 9

DISPLAY DEVICE

BACKGROUND OF THE INVENTION

1. Field of the Invention

The present invention relates to electronic appliances such as digital camera, digital camcorder and PDA (portable digital assistant), and a touch panel device This application claims the priority of the Japanese Patent Application No. 2003-049955 filed on Feb. 26, 2003, the entirety of which is incorporated by reference herein.

2. Description of the Related Art

The conventional touch panel using GUI (graphical user interface) has displayed on the display screen thereof buttons the user is to touch directly by the finger or the like for making a selection. Since the user does not actually push any mechanical button, however, he or she cannot perceptively operate such touch-panel buttons. Thus, with the conventional touch panel, the user frequently fails in correct operation or input. For solution of this problem, there has been proposed a technique by which each of on-screen buttons is shaded or otherwise processed for a stereoscopic appearance and the position of the shading is changed when the user pushes the button so that the user will feel as if he or she actually pushed a mechanical button (as disclosed in the Japanese Patent Application No. 1994-32065, for example).

With the above solution, however, a button larger in area than a user's finger should be provided for a user's easier viewing of the on-screen the button the user pushes, which will lead to an increased area occupied by the button on the display screen. Therefore, the above technique is not applicable to a touch panel having a limited area of display. Also, a small button will entirely be hidden by the finger of the user pushing the button. The conventional touch panels cannot be said to be friendly to the users.

OBJECT AND SUMMARY OF THE INVENTION

It is therefore an object of the present invention to overcome the above-mentioned drawbacks of the related art by providing a highly user-friendly display device which can display button images easily discernible by the user even if its display screen is limited in area and each on-screen button occupies the limited display area.

The above object can be attained by providing a display device including according to the present invention:

a touch panel having displayed thereon a plurality of input buttons operable by pushing; and a means for changing, when a specific input button displayed on the touch panel is pushed, the appearance of input buttons at least adjacent to the specific input button.

In the display device constructed as above, since input buttons adjacent to the pushed one changes in appearance, the user can be easily aware of the change in appearance of the adjacent input buttons on the touch panel, even if the latter is limited in display area. Thus, the user can easily know the very button that he or she has pushed.

According to another aspect of the above display device, the appearance changing means may be a one which changes the appearance of a plurality of input buttons, if any, adjacent to the pushed input button so that all the adjacent input buttons will look as if they were convergent toward the pushed input button.

With the above variant of the display device, the user can easily know the very input button that he has pushed by recognizing an animation that the adjacent input buttons look as if they were convergent toward the pushed input button.

According another aspect of the above display device, the appearance changing means may be a one which changes the appearance of the pushed input button so that input buttons adjacent to the pushed one will look as if one side thereof adjacent to th pushed input button rotated downward about a second side thereof opposite to the first side while the second side moved toward the pushed input button.

With the above variant of the display device, an animation that the adjacent input buttons appear to sink toward the pushed input button can be provided and thus the user can easily know the very button that he has pushed by recognizing the animation.

According to another aspect of the above display device, the appearance changing means may be a one which changes the appearance of the pushed input button itself and surrounding input buttons including input buttons adjacent to the pushed one so that these input buttons will look as if they sank spherically about the pushed input button toward the pushing direction.

With the above variant of the display device, the user can easily know the very button that he has pushed by recognizing an animation that the surrounding input buttons including the pushed input button appear as if they sank spherically about the pushed input button.

According to another aspect of the above display device, the appearance changing means may be a one which changes the appearance of input buttons adjacent to the pushed one so that these adjacent input buttons will blink.

With the above variant of the display device, the user can easily know the very input button that he has pushed by recognizing an animation that the input buttons adjacent to the pushed one blinks.

According to another aspect of the above display device, the appearance changing means may be a one which gradually changes the appearance of input buttons adjacent to the pushed one.

With the above variant of the display device, the user can recognize the change in appearance of the input buttons adjacent to the pushed one more positively since the adjacent input button changes in appearance gradually, and thus he can easily know the very input button that he has pushed.

Also, the above object can be attained by providing a display device including, according to the present invention:

a touch panel;

a first storage means having stored therein data for displaying a plurality of input buttons on the touch panel;

a second storage means having stored therein data on the input buttons to be changed in appearance when one of the input buttons is pushed in association with the pushed input button and for each pushed input button;

a third storage means having stored therein data on a manner of changing in appearance of each of the input buttons which are to be changed in appearance when one of the input buttons is pushed for each pushed input button; and a means for identifying ones of the input buttons which are to be changed in appearance on the basis of the data stored in the second storage means when one of the input buttons is pushed and changing the appearance of the identified input buttons on the basis of the data stored in the third storage means.

In the display device constructed as above, since the appearance of each input button is pre-managed by the three storage means, the input button can smoothly be changed in appearance on the basis of data stored in each of the three storage means.

According to another aspect of the present invention, the display device further includes an editing means for editing the data stored in the second and third storage means.

With the above variant of the display device, since the manner of changing in appearance of the input buttons when one of the input buttons is pushed can be customized, the input buttons can be changed in appearance to the user's preference.

These objects and other objects, features and advantages of the present invention will become more apparent from the following detailed description of the preferred embodiments of the present invention when taken in conjunction with the accompanying drawings.

BRIEF DESCRIPTION OF THE DRAWINGS

FIG. 9 shows a table of buttons to be animated when any of buttons in the upper portion of the touch panel 204.

DETAILED DESCRIPTION OF THE PREFERRED EMBODIMENTS

The present invention will be described below concerning digital cameras as embodiments of the present invention with reference to the accompanying drawings.

Figure 1:
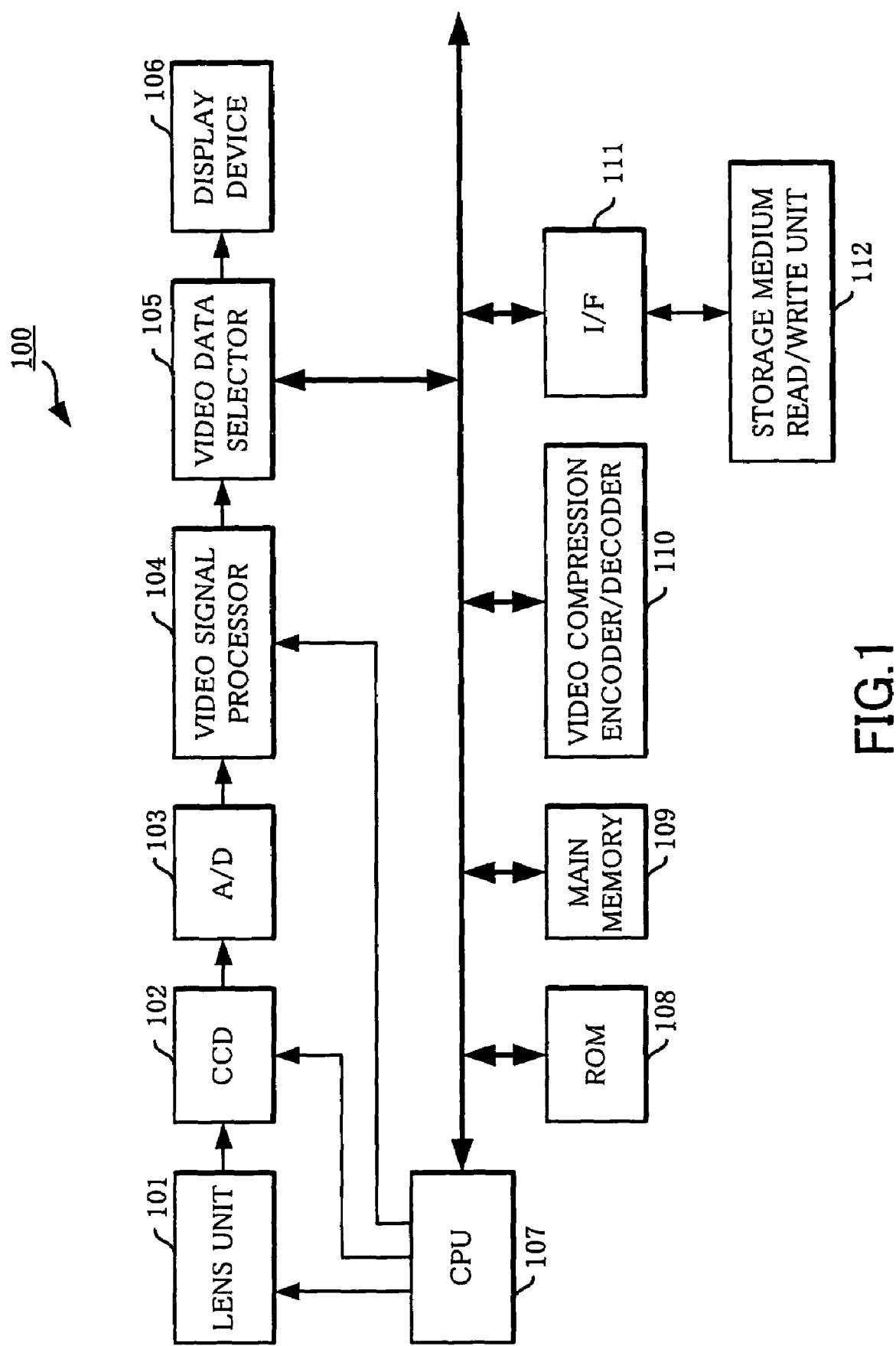
FIG. 1 is a block diagram of the digital camera 100 as one embodiment of the present invention, showing the electrical connection in the digital video camcorder.

FIG. 1 is a block diagram of the digital camera 100, showing the electrical connection in the digital camera 100.

As shown, the digital camera 100 has a pickup unit composed of a lens unit 101 and CCD (charge-coupled device) 102. The lens unit 3 has the aperture or focus thereof automatically controlled by a control signal from a CPU 107. An output signal from the CCD 102 is converted by an A-D (analog-digital) converter 103 into a digital signal, and then passed to a video signal processor 104. The video signal processor 104 generates RGB signal for each of pixels in the supplied digital signal, and supplies the RGB signals to a liquid crystal panel 106 via a video data selector 105.

The CPU 107 has connected to a bus 113 thereof a main memory 109, ROM (read-only memory) 108, video compression encoder/decoder 110 and the video data selector 105. The main memory 109 includes a DRAM (dynamic random access memory) or the like and is capable of rapid data read and write. It is used as a working area of the CPU 107, display frame buffer or the like. The ROM 108 is a non-volatile memory having various programs and data fixedly stored therein. The video compression encoder/decoder 110 is a circuit module to compress or expand a static image using JPEG (Joint Photographic Experts Group) and a moving image using MPEG (Moving Picture Experts Group), for example. The video data selector 105 selects a destination to which video data is to be transferred.

To the bus 113, there is further connected a storage medium read/write unit 112 to read and write data from and to a portable storage medium such as a flash memory via an interface (I/F) 111.

The CPU 107 controls information transfer between the system components via the bus 113, and it loads a necessary program and data from the ROM 108 to the main memory 109 to control the digital camera 100 according to the program and make a variety of data processing.

Figure 2:
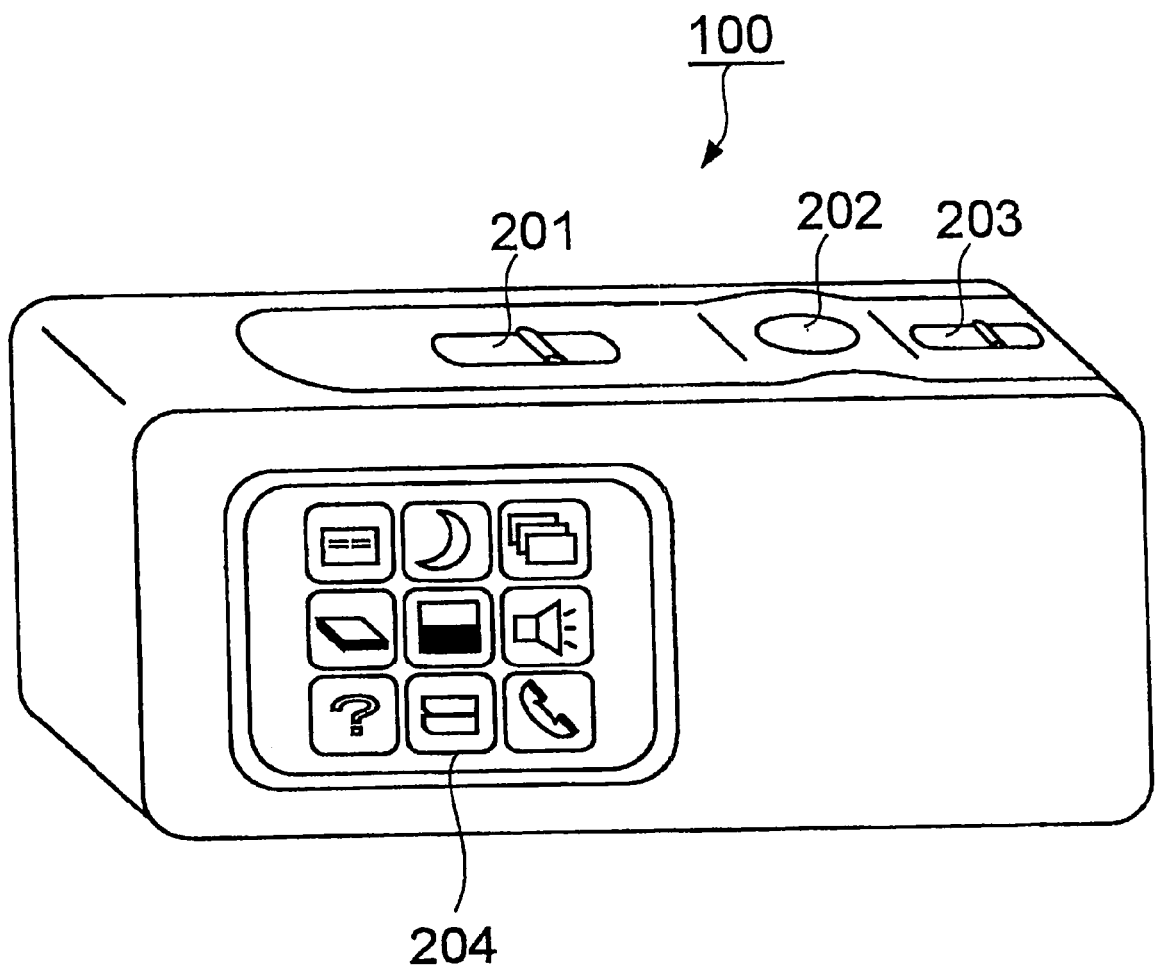
FIG. 2 is a perspective view of the digital camera 100 in FIG. 1.

FIG. 2 is a perspective view of the digital camera 100 in FIG. 1.

As shown in FIG. 2, the digital camera 100 has provided on the top thereof control switches such as a power on-off switch (slide switch) 201, shutter switch (pushbutton switch) 202, take/review switch (slide switch) 203, etc.

Figure 4:
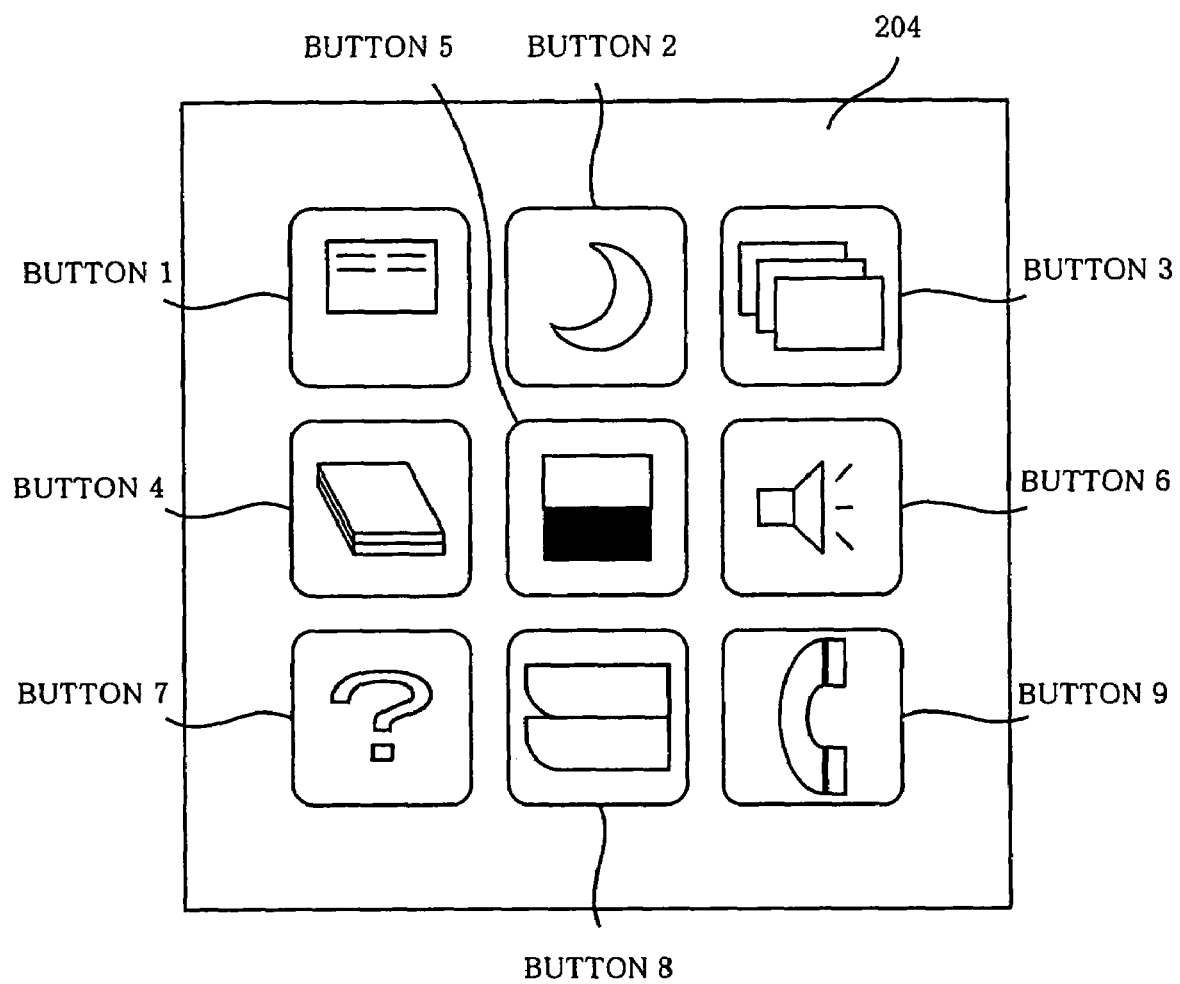
FIG. 4 shows an example of the touch panel included in the embodiment of the present invention.

The liquid crystal panel 106 is used as an image display when taking or reviewing a picture and as a touch panel 204 when performing and setting one of various functions of the digital camera 100. The user makes a selection between the image display and touch panel depending upon an intended application. The touch panel 204 has displayed thereon a plurality of input buttons as menu items as shown in FIG. 4. The input buttons have assigned in one-one relation thereto functions that can be performed by the digital camera 100, such as pixel setting, take mode setting, review mode setting, etc. The user can start up and set each of various take and review functions by pushing a corresponding one of the buttons.

Figure 3:
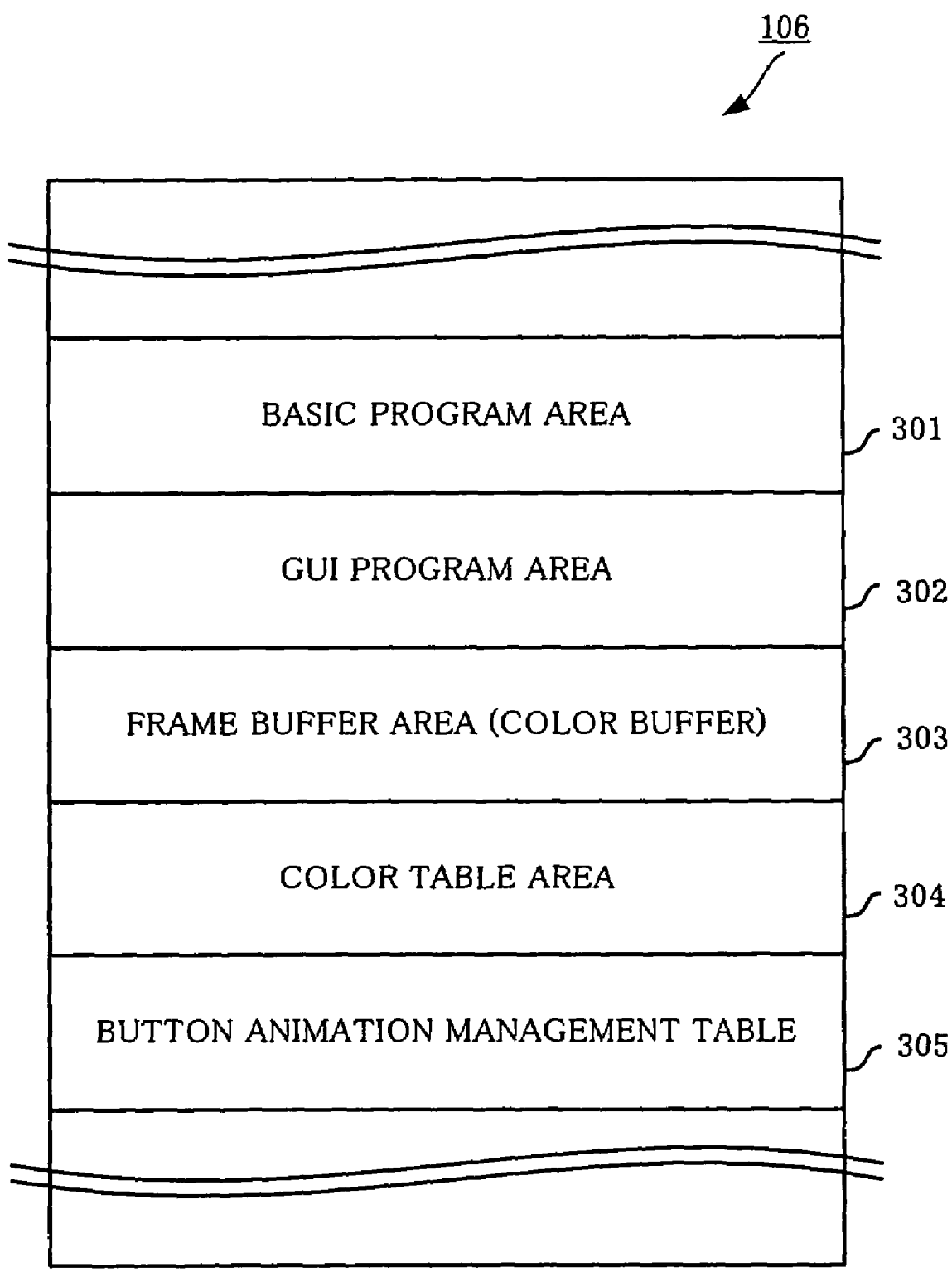
FIG. 3 shows program and data storage areas in a main memory 106, which are secured when buttons are displayed on the screen of a touch panel 204.

FIG. 3 shows the main memory 109 including program and data storage areas which are secured when displaying the buttons on the screen of the touch panel 204. As shown, the main memory 106 has at least a basic program area 301, GUI (graphical user interface) program area 302, frame buffer area 303, color table area 304 and a button animation management table 305 set therein when displaying the input buttons on the touch panel 204.

The basic program area 301 has stored therein a basic program for operation of the digital camera 100. The GUI program area 302 has stored therein a GUI implementing program which manipulates input buttons on the touch panel 204 under the basic program stored in the basic program area 301, recognizes an input button selected by the user touching that input button among the plurality of input buttons displayed on the touch panel 204, evoking a function program associated with the selected input button from the ROM 108, etc.

The frame buffer area 303 has stored therein image data on the plurality of input buttons to be displayed on the screen of the touch panel 204. The frame buffer area 303 is used as a color buffer for storage of a color number for each pixel. The color table area 304 has stored therein a color number-RGB value correspondence table. A RGB value is evoked from the color table area 304 correspondingly to a color number stored in the frame buffer area 303, and the RGB value is supplied to the touch panel 204 via the video data selector 105. The button animation management area 305 will be described in detail later.

Next, how to display input buttons on the touch panel 204 will be illustrated and explained.

According to the present invention, the display device also functions, when the user pushes one of the input buttons displayed on the screen of the touch panel 204, to animate input buttons adjacent to the pushed input button. In this explanation of this embodiment, it is assumed that nine square buttons are disposed as the input buttons on the touch panel 204 as shown in FIG. 4. It should be noted that the input buttons are numbered by "1" to "9" for the convenience of the explanation. Namely, the input buttons include buttons 1, 2, 3, . . . , and 9.

Figure 5:
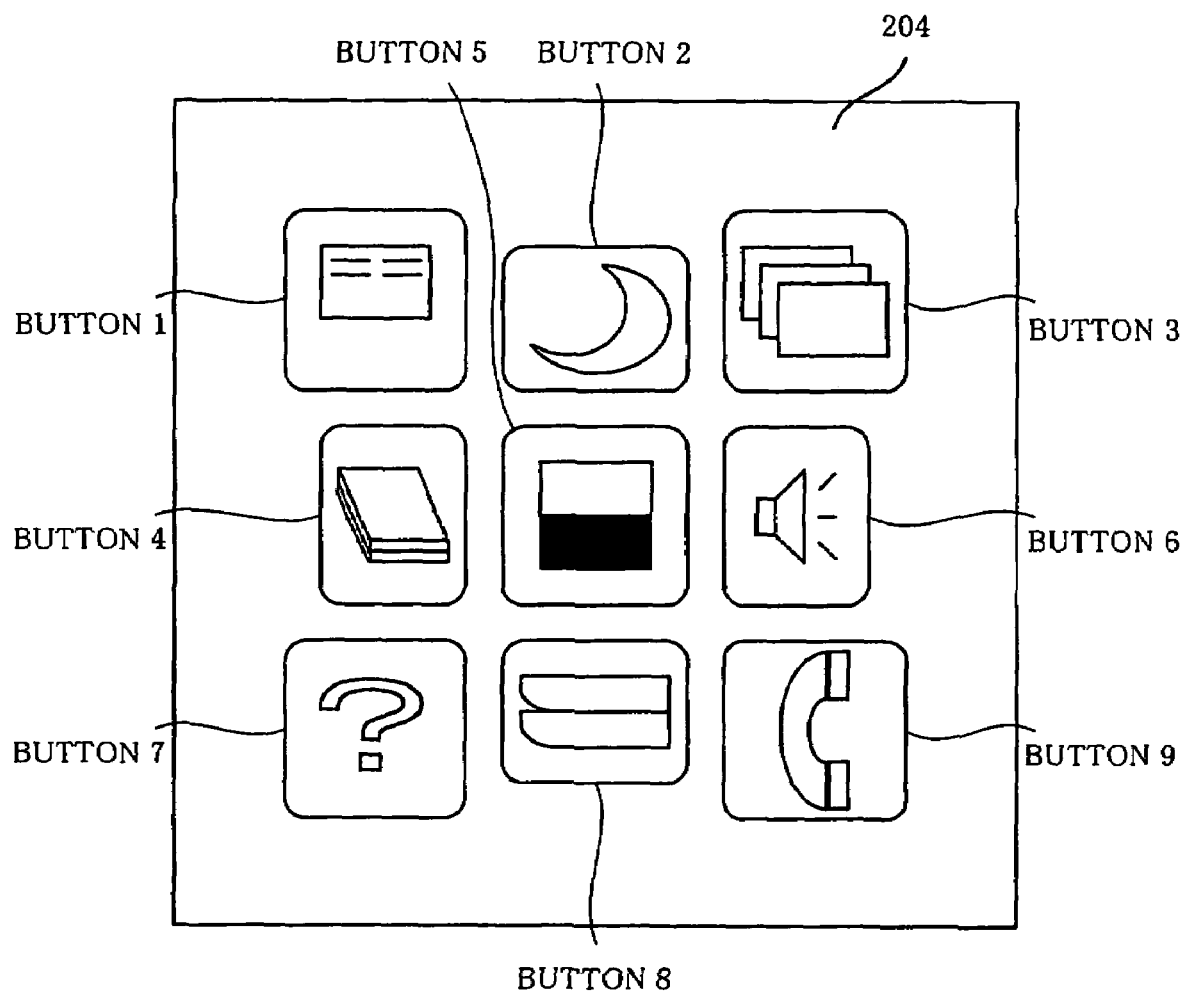
FIG. 5 is a front view of button images displayed on the screen of the touch panel 204 when the user has pushed a button 5.
Figure 6:
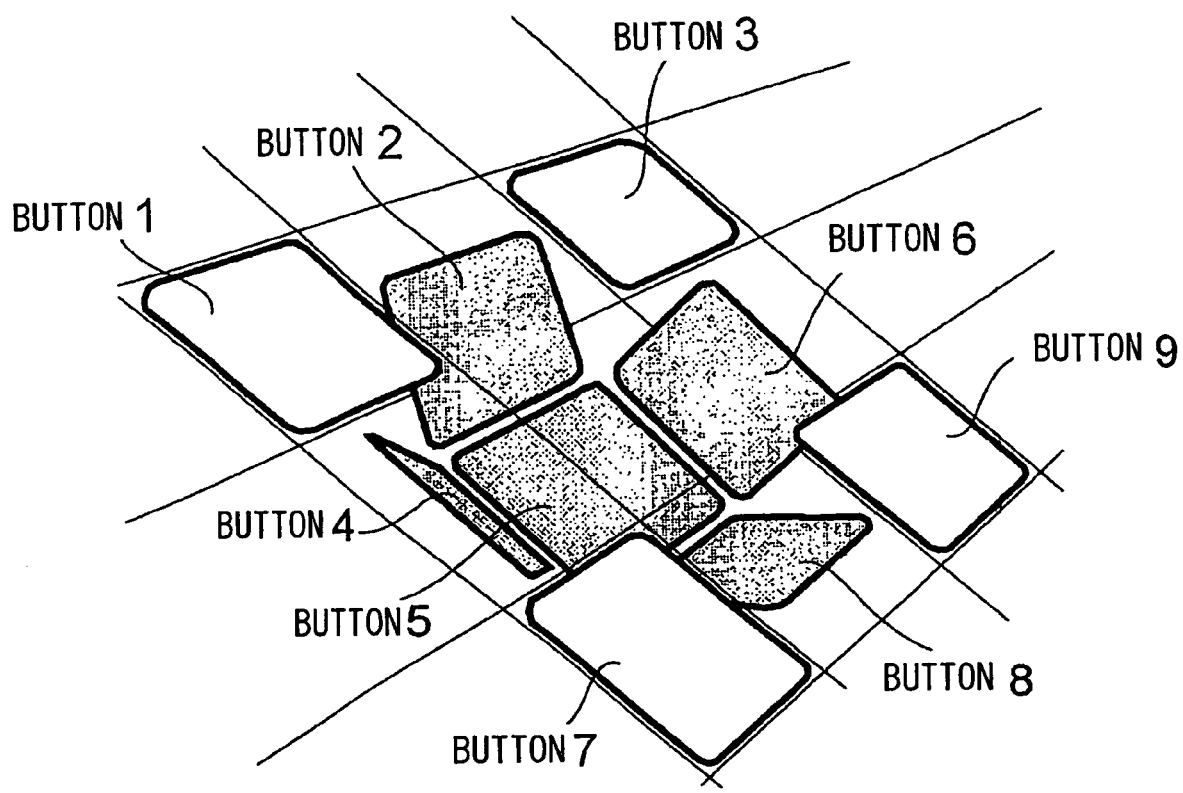
FIG. 6 is an oblique view, like a three-dimensional appearance, of button images displayed on the screen of the touch panel 204 when the user has pushed the button 5.

FIG. 5 is a front view of the button images displayed on the screen of the touch panel 204 when the user has pushed the button 5, and FIG. 6 is an oblique view, like a three-dimensional appearance, of the images of the input buttons displayed on the screen of the touch panel 204 when the user has pushed the button 5.

As shown in both FIGS. 5 and 6, when the user pushes the button 5, the upper, lower, left and right button 5, the buttons 2, 4, 6 and 8 adjacent to the pushed button 5 look as if they were convergently animated toward the pushed button 5. It should be note that the "converge" referred to herein means that all things around a certain object are gathered together toward the object at a constant speed.

Figure 7:
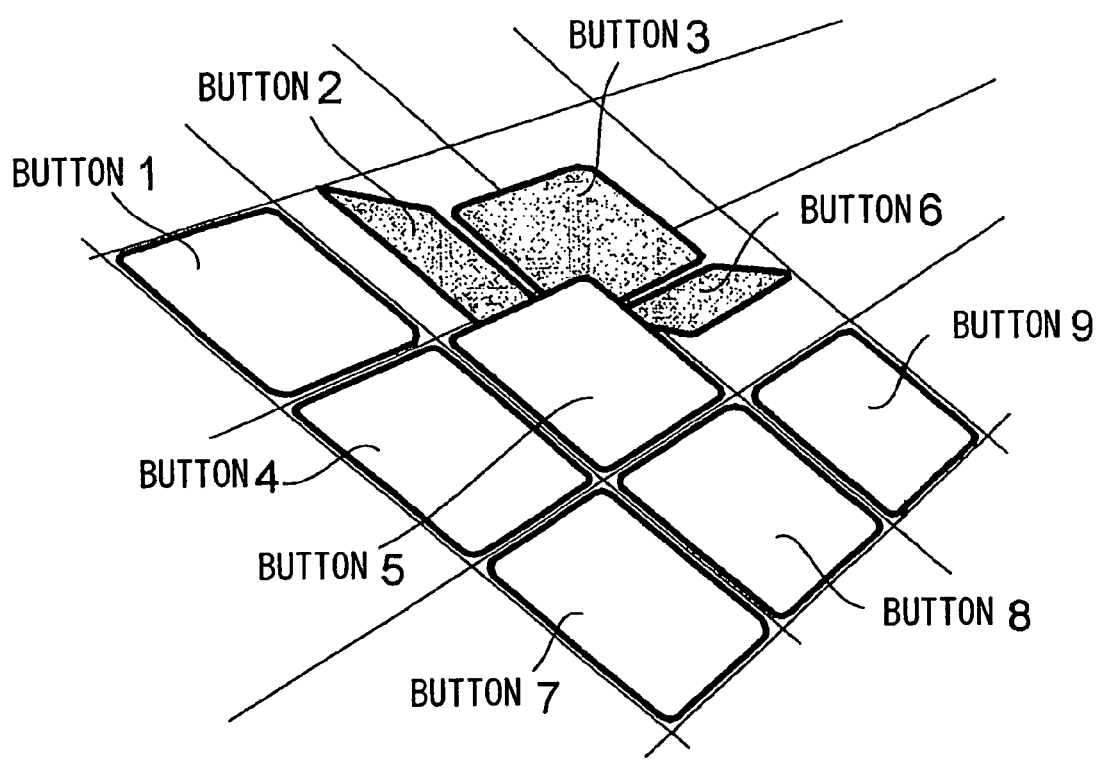
FIG. 7 is an oblique view, like a three-dimensional appearance, of button images displayed on the screen of the touch panel 204 when the user has pushed a button 3.

Concerning the movement of one of the adjacent input buttons to be animated, the adjacent input button will look as if one side thereof adjacent to th pushed input button rotated downward about a second side thereof opposite to the first side while the second side moved toward the pushed input button. Also, when the user pushes another input button, the upper, lower, left and right input buttons adjacent to the pushed input button look as if they were convergently animated toward the pushed input button. For example, when the user pushes the button 3, the left input button 2 adjacent to the button 3 and lower adjacent input button 6 look as if they ere convergently animated toward the input button 3 as shown in FIG. 7.

Figure 8:
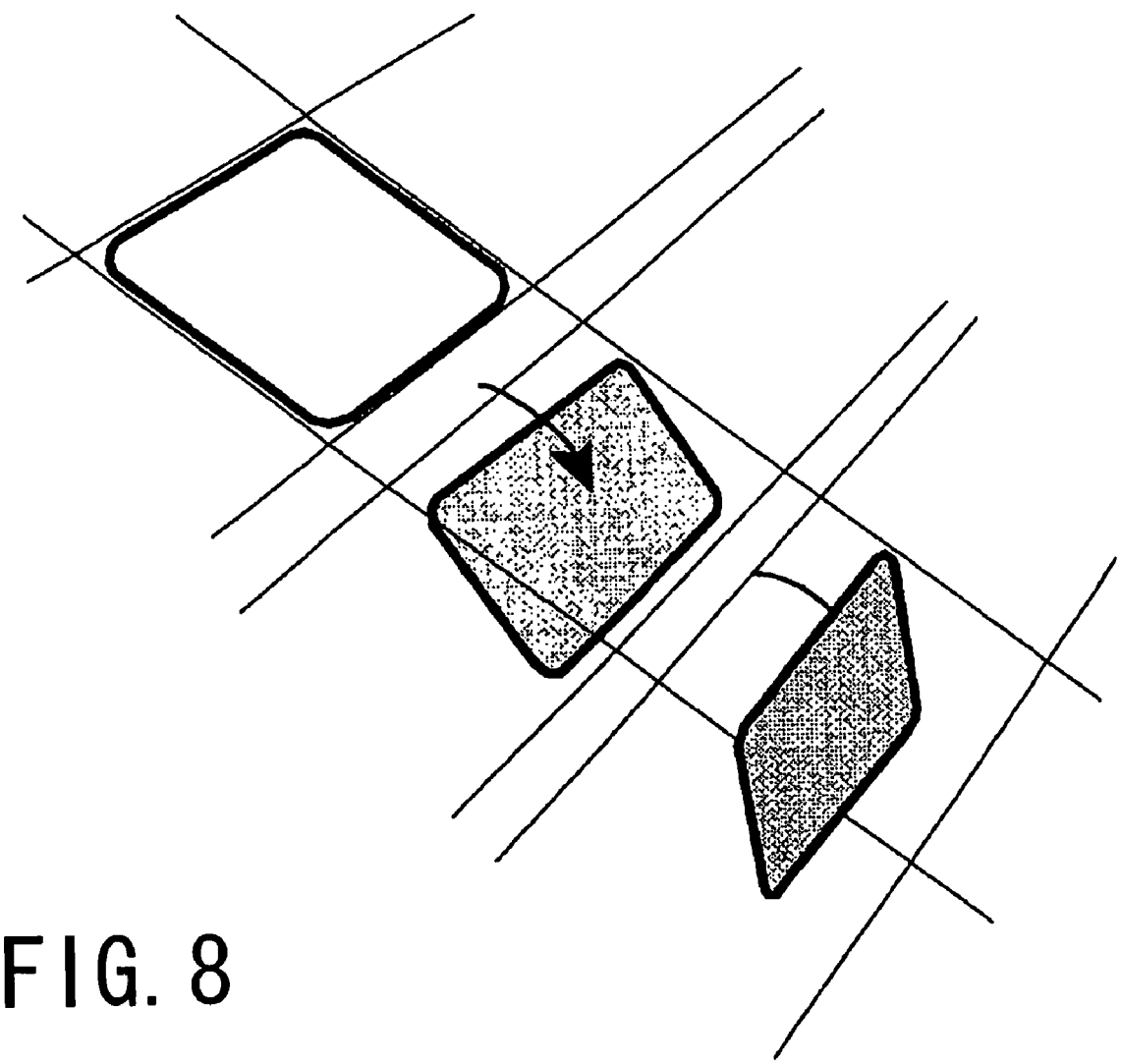
FIG. 8 provides stepwise views showing an animation of an input button and an input button to the pushed one.

FIG. 8 provides stepwise views showing an animation of an input button and an input button adjacent to the pushed one. As shown, when an input button is pushed, the input button adjacent to the pushed one look as if it moved toward the pushed input button while being gradually rotated.

Note that when the user takes the finger off the input button which he has been pushed, the pushed input button and adjacent input button are reversely animated and return to their initial states. More specifically, the pushed input button will move back to the initial position and the adjacent input button will return to its initial position as shown in FIG. 4 while being gradually rotated away from the pushed one.

With this system design of the display device, since the pushed input button and adjacent one are animated simultaneously, it is possible even on a touch panel whose screen is unavoidably limited in area as used with a digital camera, for example, for the user to recognize the animation of the adjacent input button and thus easily know the input button he has pushed.

FIG. 9 shows a table of ones of input buttons in the aforementioned button animation management table 305, which are to be animated when any of buttons in the upper portion of the touch panel 204. In this table, generally indicated with a reference number 901, which will be referred to as "animation button data" hereunder, input buttons included in the aforementioned button animation management table and which are to be animated when an input button on the touch panel 204 is pushed are associated with the pushed input button. In this table 901, the left-side column lists input buttons to be pushed and the right-side column lists input buttons to be animated when any one of the buttons in the left column is pushed. As having previously been described, the data on the input buttons are stored in the main memory 106.

As will be seen from FIG. 9, this embodiment is systematically set so that when an input button is pushed, upper, lower, left and right input buttons adjacent to the pushed input button animated. It should be noted that by rewriting the right-side column of the animation button data 901, the input buttons to be animated can freely be set as customized. That is, this embodiment is so set that upper, lower, left and right input buttons adjacent to a push input button can be animated. However, by additionally writing input buttons obliquely adjacent to a pushed input button to the right-side column of the animation button data 901, the above setting of this embodiment can be changed so that such input buttons obliquely adjacent to a pushed input button can also be animated. Thus, the display device according to the present invention can provide an animation of input buttons that meets a user's preference and more convenient and friendly to the user.

Figure 10A:
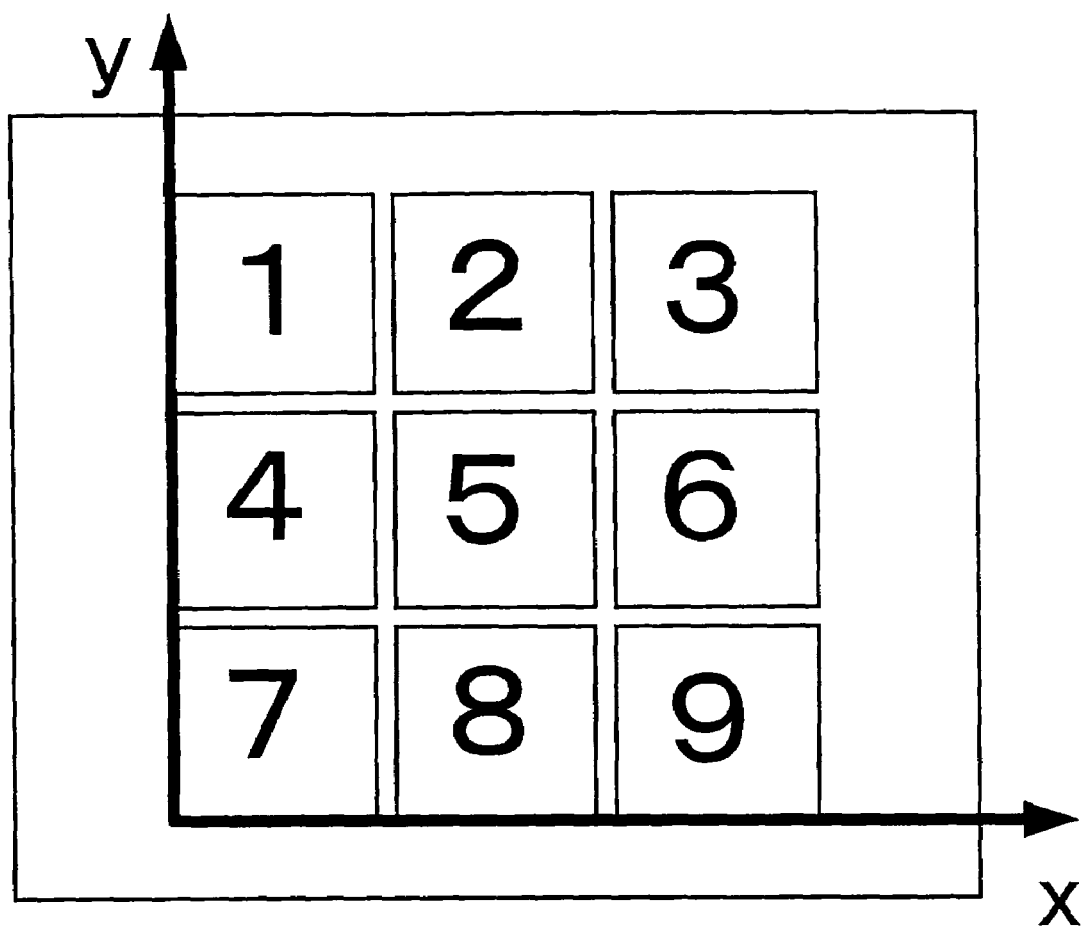
FIG. 10 shows, in the form of a coordinate, the touch panel 204 and buttons on the touch panel 204.
Figure 10B:
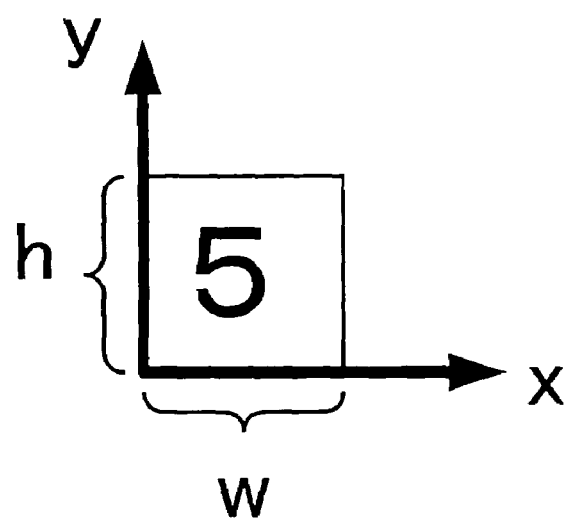

FIG. 10 shows, in the form of a coordinate, the touch panel 204 and input buttons on the touch panel 204. FIG. 10(*a*) shows a coordinate system of the entire touch panel (will be referred to as "touch-panel coordinate system" hereunder) and FIG. 10(*b*) shows a local coordinate system of an input button. For the simplicity of the explanation, it is assumed here that each of all the input buttons has an origin located at the lower left of the touch-panel coordinate system and a positive-going coordinate value and thus the local coordinate system of each input button is a part of the touch-panel coordinate system. In FIG. 10(*b*), "w" indicates a width of the input button and "h" indicates a height of the input button. The button animation will be described herebelow using these two coordinate systems.

As having been described above, when a button is pushed, the buttons adjacent to the pushed button look as if they moved convergently toward the push button while being gradually rotated. The movement of the button 5 of those changed in appearance when the button 4 is pushed will be explained by way of example. When the button 4 is pushed, the button 5 rotates in the positive direction (clockwise) about a side thereof opposite to a side adjacent to the button 4, that is, a straight line overlapping the right side of the button 5. For rotating the button 5 gradually four turns of 10, 20, 30 and 40 deg. in this order, for example, the animation of this button 5 will be stated as follows:

rot(w, 0)-(w, 1), 10, 20, 30, 40 where "rot" indicates "rotate" and "(w, 0)-(w, 1)" indicates that a straight line (x=w) drawn in the direction of (w, 0)-(w, 1) in the local coordinate system of the button 5 is taken as an axis of rotation.

While being rotated, the button 5 has the local coordinate system thereof translated in the negative direction of the x-axis of the touch-panel coordinate system. In case the button 5 is gradually moved by 10, 20, 30 and 40 dots in this order, the animation of the button 5 is stated as follows:

mov(−1, 0), 10, 20, 30, 40 where "mov" indicates "move" and "(−1, 0)" indicates that the button 5 is translated in the negative direction of the x-axis of the touch-panel coordinate system.

Figure 11:
FIG. 11 shows a table having an animation of the button 5 stated therein.

Stating all the animations of the button 5 using the above-mentioned manner results in a table as shown in FIG. 11 (will be referred to as "animation data" hereunder) 1101. The animation data 1101 is also stored as the aforementioned button animation management table 305 along with the animation button data 901 in the main memory 106. The animations of all the buttons are controlled on the basis of both the above-mentioned animation button data 901 and animation data 1101.

The statement of the animation data 1101 can be altered similarly to the aforementioned animation button data 901. The button animation can be customized concerning the angle of rotation, moving distance, speed, etc. Thus, there can be provided a user interface meeting the user's preference and more convenient and friendly to the user.

Next, rendering of a button to be animated by a three-dimensional computation will be illustrated and explained.

Figure 12:
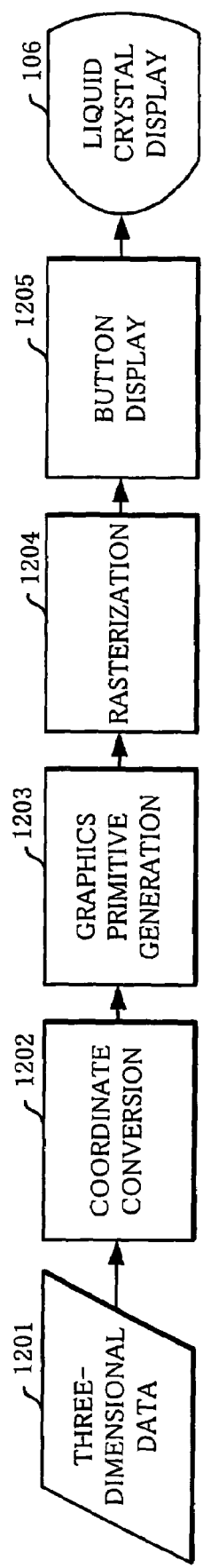
FIG. 12 shows a procedure for rendering a three-dimensional model data on a button.

FIG. 12 shows a procedure for rendering a three-dimensional model data on a button. First, three-dimensional model data 1201 on the button, including positions, in a three-dimensional coordinate, of graphics primitives such as a polygon, point, line, plane, etc., attributes of the line and plane, color data, etc. are read from the ROM 108 and three-dimensional coordinates of all points of the button are converted into two-dimensional coordinates (coordinate conversion 1202). Next, the button data having been converted into the two-dimensional coordinates are processed so that one of the surfaces of a button to be rotated and moved, nearest to the surface of a pushed button, looks as if it is in the innermost position. This is called "hidden surface elimination" (graphics primitive generation 1203). Then, a color number of each pixel is written to the color buffer on the basis of the button data having undergone the hidden surface elimination (rasterization 1204). From a color table in which the relation between RGB value and color number is stored, a relevant RGB value is evoked from the color table on the basis of a color number of each pixel stored in the color buffer, and converted into video signal which can be processed in the display device. The video signal is displayed on the touch panel 204 (button display 1205).

Since the above system design makes it possible to represent, by the hidden surface elimination, how a button adjacent to a pushed one is rotated and moved toward the pushed button, the user can recognize the button he has pushed more easily because of the real visual effect brought by the hidden surface elimination.

Figure 13:
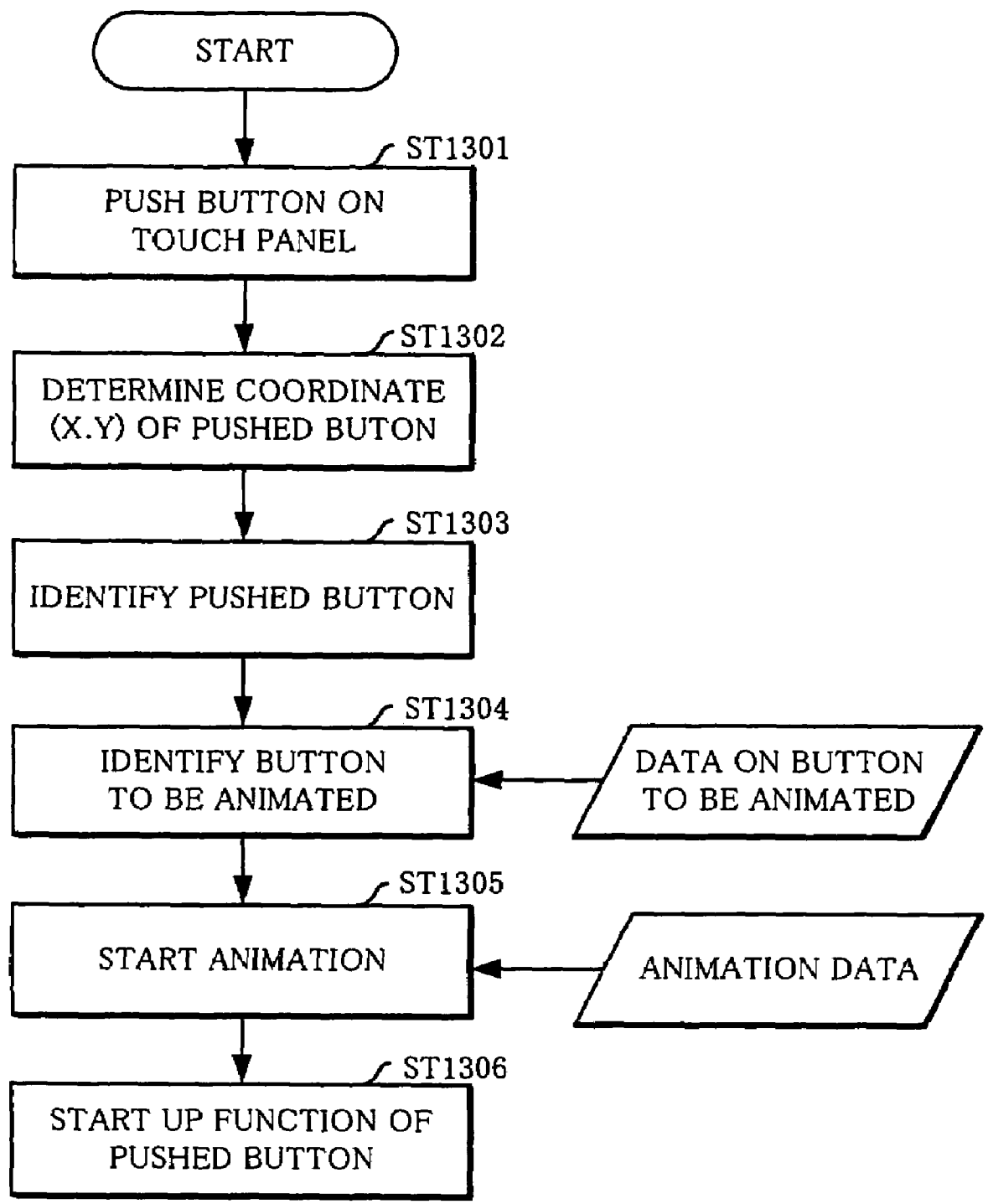
FIG. 13 shows a flow of operations made in animation of a button on the touch panel after the user pushes the button.

FIG. 13 shows a flow of operations made in animation of a button after the user pushes the button.

As shown, when one of the buttons on the touch panel is pushed in step ST1301, the touch panel will determine a coordinate (x, y) of the pushed button in the touch-panel coordinate system in step ST1302. Then the touch panel 204 identifies the pushed button in step ST1303. Next in step ST1304, the touch panel 204 acquires list of buttons to be animated when the identified button is pushed from the animation button data 901. When a button to be animated is thus identified, the touch panel 204 determines, in ST1305, how the button is to be animated on the basis of the animation data 1101. After completion of the animation, the touch panel 204 will start up the function of the pushed button in step S1306.

When the user pushes a button whose function is to be started up as above, the appearance of the buttons adjacent to the pushed button is changed by the animation on the basis of pre-stored data. Thus, the user can easily recognize the button he himself has pushed because of the visual effect of the animation, and can positively perform a user-selected function of the digital camera 100. Also, the user can customize the animation by changing the animation button data 901 and animation data 1101. Thus, the touch panel can be more convenient and friendly to the user.

As above, since the aforementioned embodiment of the digital camera 100 is designed to change the animation of a button the user selects and pushed on the touch panel as well as of buttons adjacent to the pushed button, the user can easily recognize the button he himself has pushed because of the visual effect even on a touch panel having buttons whose display areas are so small as to be hidden by the user's finger. Thus, the user can operate the digital camera 100 and make input on the touch panel with less errors.

Also, by storing buttons to be animated in the button animation management table 305 in the main memory and rewriting the statement in the table 305, the user can customize the modification of the animation of the adjacent buttons. Thus, the display device can be a highly convenient user interface meeting the user's preference.

Figure 14:
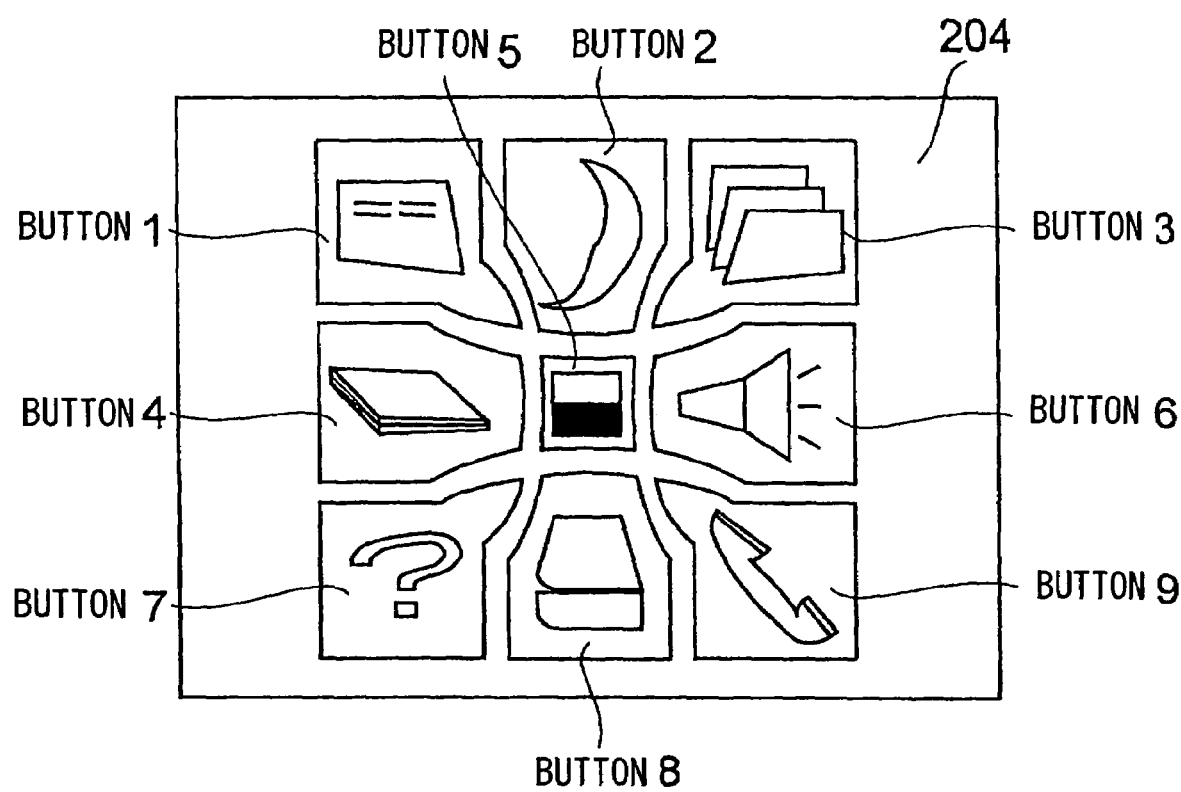
FIG. 14 is a front view of button images displayed when the user pushes the button 5 in another embodiment of the present invention.

Note that although the button animation has been described concerning the rotation and movement of the buttons, the animation may be any one in which a change in appearance of the adjacent buttons would enable the user to easily recognize the pushed button. For example, the animation may be such that when an input button is pushed, the pushed button and surrounding input buttons adjacent to the pushed button look as if they were sunk in the direction of button pushing and about the pushed input button, as shown in FIG. 14.

Otherwise, the animation may be such that when a button is pushed, buttons adjacent to the pushed button are changed in color or blink.

Furthermore, the animation of input buttons may be such that the speed thereof can be changed depending upon a pressure applied by the finger to an input button, namely, such that pressing an input button with a large pressure causes the input button to move fast while pressing with a weak pressure causes the input button to move slowly.

Although the digital camera has been described as the embodiment of the present invention, the display device according to the present invention is applicable to all electronic appliances such as a digital camcorder, PDA, portable phone and the like to which a touch panel can be applied.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

As having been described in the foregoing, the present invention can change the animation of a pushed button as well as of buttons adjacent to the pushed one and thus enables the user to easily recognize a button he has pushed on a touch panel whose buttons are so small in area as to be hidden by the user's finger.

Also, by customizing the manner of changing the animation of the adjacent buttons, there can be provided a user interface meeting the user's preference and highly convenient and friendly to the user.

What is claimed is:

1. A display device comprising:
   a touch panel;
   a first storage means having stored therein data for displaying a plurality of input buttons on the touch panel;
   a second storage means having stored therein data on the input buttons to be changed in appearance when one of the input buttons is pushed in association with the pushed input button and for each pushed input button;
   a third storage means having stored therein data on a manner of changing in appearance of each of the input buttons which are to be changed in appearance when one of the input buttons is pushed for each pushed input button; and
   a means for identifying ones of the input buttons which are to be changed in appearance on the basis of the data stored in the second storage means when one of the input buttons is pushed and changing the appearance of the identified input buttons on the basis of the data stored in the third storage means;
   wherein the third storage means stores data for changing the appearance of the pushed input button and surrounding input buttons including input buttons adjacent to the pushed input button so that these input buttons will look as if they sank spherically about the pushed input button toward the pushing direction.

2. A display device comprising:
   a touch panel;
   a first storage means having stored therein data for displaying a plurality of input buttons on the touch panel;
   a second storage means having stored therein data on the input buttons to be changed in appearance when one of the input buttons is pushed in association with the pushed input button and for each pushed input button;
   a third storage means having stored therein data on a manner of changing in appearance of each of the input buttons which are to be changed in appearance when one of the input buttons is pushed for each pushed input button; and
   a means for identifying ones of the input buttons which are to be changed in appearance on the basis of the data stored in the second storage means when one of the input buttons is pushed and changing the appearance of the identified input buttons on the basis of the data stored in the third storage means;
   wherein the third storage means stores data for changing the appearance of the pushed input button so that input buttons adjacent to the pushed input button will look as if one side thereof adjacent to the pushed input button rotates downward about a second side thereof opposite to the first side while the second side moves toward the pushed input button.

3. The display device as set forth in claim 2, further comprising an editing means for editing the data stored in the second and third storage means.

4. A display device comprising:
   a touch panel having displayed thereon a plurality of input buttons operable by pushing; and
   a means for changing, when a specific input button displayed on the touch panel is pushed, the appearance of input buttons at least adjacent to the specific input button;
   wherein the appearance changing means changes the appearance of the pushed input button so that input buttons adjacent to the pushed input button will look as if one side thereof adjacent to the pushed input button rotates downward about a second side thereof opposite to the first side while the second side moves toward the pushed input button; and
   wherein the appearance changing means changes the appearance of the pushed input button and surrounding input buttons including input buttons adjacent to the pushed input button so that these input buttons will look as if they sank spherically about the pushed input button toward the pushing direction.

5. The display device as set forth in claim 4, wherein the appearance changing means changes the appearance of a plurality of input buttons, adjacent to the pushed input button so that all the adjacent input buttons will look as if they were convergent toward the pushed input button.

6. The display device as set forth in claim 4, wherein the appearance changing means changes the appearance of input buttons adjacent to the pushed input button so that these adjacent input buttons will blink.

7. The display device as set forth in claim 4, wherein the appearance changing means gradually changes the appearance of input buttons adjacent to the pushed input button.

* * * * *

UNITED STATES PATENT AND TRADEMARK OFFICE
CERTIFICATE OF CORRECTION

| | |
|---|---|
| PATENT NO. | : 7,298,364 B2 |
| APPLICATION NO. | : 10/785323 |
| DATED | : November 20, 2007 |
| INVENTOR(S) | : Kouichi Matsuda et al. |

Page 1 of 1

It is certified that error appears in the above-identified patent and that said Letters Patent is hereby corrected as shown below:

On the title page, item (57), line 10, "to th" should read --to the--.

Signed and Sealed this

Twenty-first Day of April, 2009

JOHN DOLL
*Acting Director of the United States Patent and Trademark Office*